Patented Apr. 16, 1935

1,997,998

UNITED STATES PATENT OFFICE 1,997,998

FLUID COMPOSITION

George L. Doelling, St. Louis, Mo., assignor to Wagner Electric Corporation, St. Louis, Mo., a corporation of Delaware No Drawing. Application January 13, 1934, Serial No. 706,575

13 Claims. (Cl. 252—5)

My invention relates to an operating fluid for use in fluid pressure systems such as hydraulic brake actuating equipment.

In view of the fact that so far as now known, rubber compositions constitute the most suitable material for the piston sealing element of the compressor and motor elements of brake actuating apparatus, and of the fact that this apparatus and parts thereof are subject to extreme ranges of atmospheric temperature when used in temperate and cold climates, the operating fluid should have several special characteristics. It should have a relatively high vaporizing point and a low freezing point; should be somewhat viscous at high temperatures and yet not become too viscous at extremely low temperatures to flow freely; should have lubricating quality and should not adversely affect the durability or size of the rubber piston sealing cup, nor corrode the surface of the cylinder and conduits with which it contacts.

The most commonly used types of brake operating fluids are mixtures of castor oil with an alcohol, but castor oil (whose chief ingredient is glyceryl tri-ricinoleate), while having the desired lubricating quality and little, if any, deteriorating effect upon rubber, is subject to the very definite disadvantage that it has relatively high viscosity at low temperatures and that it freezes at a moderately low temperature. Furthermore, it has low solubility in alcohols and other diluents at temperatures such as prevail in winter in northern countries.

I have discovered an operating fluid for use in hydraulic braking apparatus which has the desired properties and which need not embody any castor oil, although small quantities of castor oil may be added for use under certain conditions, as hereinafter set forth.

My new fluid comprises an ester of ricinoleic acid lower than a tri-ricinoleate, and a low viscosity fluid having a low freezing point and serving as a diluent.

A preferred formula for my new fluid is 50 parts by volume of glyceryl di-ricinoleate

([HOC$_{17}$H$_{32}$COO]$_2$C$_3$H$_5$OH)

and 50 parts by volume of diacetone alcohol. I do not limit myself, however, to this particular formula since the proportions may be varied and since other diluents may be used and other esters of ricinoleic acid may be substituted for glyceryl di-ricinoleate. Among the latter are methyl ricinoleate, ethyl ricinoleate, and butyl ricinoleate, but the esters in this series whose alkyl group has more than five carbon atoms, are not desirable on account of the swelling effect upon rubber. Other suitable esters are ethylene glycol mono-ricinoleate, ethylene glycol di-ricinoleate and ricinoleates of other glycols and polyglycols. Glyceryl mono-ricinoleate is also suitable, and, stated in general terms, the ricinoleates of monatomic alcohols having not over five carbon atoms per molecule and the mono or di-ricinoleates of di or tri-atomic alcohols having not over five carbon atoms per molecule can be used.

As diluents, aliphatic alcohols having not more than six carbon atoms (ethyl, propyl, or tetrahydrofurfuryl, for example), or a glycol ether, such as ethylene glycol ethyl ether, are suitable.

In fluid using diluents other than diacetone alcohol, it is desirable to add a small quantity of a neutralizing agent such as potassium arsenite to neutralize any free acidity.

In a fluid to be used in a climate where winter temperatures are not extremely low, some castor oil may be used to reduce the cost of the fluid, this material being somewhat cheaper than the ricinoleate esters herein designated. A suitable fluid of the class just mentioned would be made up as follows: 30 parts by volume of methyl ricinoleate; 20 parts by volume of castor oil; and 50 parts by volume of ethyl alcohol. This fluid should also contain a neutralizing agent, such as potassium arsenite, approximately one gram of this neutralizer per gallon of fluid being sufficient.

By way of comparison of my new fluids with prior fluids, a fluid composed of 50 parts glyceryl di-ricinoleate and 50 parts diacetone alcohol has a freezing point more than twenty degrees lower than a fluid composed of 50 parts castor oil and 50 parts diacetone alcohol, and also has lower viscosity over the lower temperature ranges.

While I have named several suitable diluents, I do not intend that the scope of my invention be limited to fluids embodying one or more of these. Any fluid which is substantially inert to rubber and metals and does not react with the ricinoleate and which has low viscosity, low freezing point, and a vaporizing point considerably above atmospheric temperature, will accomplish the purposes of a diluent which is to reduce the viscosity of brake fluid.

By the expression "lower than glyceryl tri-ricinoleate" used herein, I refer to ricinoleates having a smaller molecule than glyceryl tri-ricinoleate. These are mono-ricinoleates of mono, di, or tri-atomic alcohols and di-ricinoleates of di or tri-atomic alcohols (the alcohols having not more than 5 carbon atoms per molecule).

Having fully described my invention, what I claim as new and desire to secure by Letters Patent of the United States is:

1. An operating fluid for pressure apparatus comprising one of the class consisting of mono-ricinoleates of mono, di, or tri-atomic alcohols and di-ricinoleates of di or tri-atomic alcohols (the alcohol having not more than five carbon atoms per molecule), and a diluent having a low freezing point.

2. An operating fluid for pressure apparatus comprising glyceryl di-ricinoleate and a diluent having a low freezing point.

3. An operating fluid for pressure apparatus comprising glyceryl mono-ricinoleate, and a diluent having a low freezing point.

4. An operating fluid for pressure apparatus comprising one of the class consisting of mono-ricinoleates of mono, di, or tri-atomic alcohols and di-ricinoleates of di or tri-atomic alcohols (the alcohol having not more than five carbon atoms per molecule), and an alcohol having not over six carbon atoms per molecule.

5. An operating fluid for pressure apparatus comprising one of the class consisting of mono-ricinoleates of mono, di, or tri-atomic alcohols and di-ricinoleates of di or tri-atomic alcohols (the alcohol having not more than five carbon atoms per molecule), and an ether of a glycol.

6. An operating fluid for pressure apparatus comprising one of the class consisting of mono-ricinoleates of mono, di, or tri-atomic alcohols and di-ricinoleates of di or tri-atomic alcohols (the alcohol having not more than five carbon atoms per molecule), and ethyl ether of ethylene glycol.

7. An operating fluid for pressure apparatus comprising glyceryl di-ricinoleate and diacetone alcohol.

8. An operating fluid for pressure apparatus consisting of approximately 50 parts by volume of glyceryl di-ricinoleate and 50 parts by volume of diacetone alcohol.

9. An operating fluid comprising a ricinoleate of a glycol (the glycol having not over five carbon atoms per molecule), and a diluent having a low freezing point.

10. An operating fluid comprising a ricinoleate of a glycol (the glycol having not over five carbon atoms per molecule), and ethyl ether of ethylene glycol.

11. An operating fluid comprising a ricinoleate of a glycol (the glycol having not over five carbon atoms per molecule), and an alcohol having not over six carbon atoms per molecule.

12. An operating fluid for pressure apparatus comprising a mono or di ricinoleate of glycerol, and an alcohol having not over six carbon atoms per molecule.

13. An operating fluid for pressure apparatus comprising a mono or di ricinoleate of glycerol, and ethyl ether of ethylene glycol.

GEORGE L. DOELLING.